2,705,248

PRODUCTION OF XYLENES

Robert Reid Coats and Donald William Ingram, Norton-on-Tees, England, assignors to Imperial Chemical Industries Limited, a corporation of Great Britain No Drawing. Application April 3, 1950,
Serial No. 153,756

Claims priority, application Great Britain April 25, 1949

6 Claims. (Cl. 260—668)

This invention relates to the production of xylenes.

According to the present invention there is provided a process for the production of a valuable xylene or xylenes fraction, which comprises continuously passing a hydrocarbon mixture containing at least one of the xylenes in the vapour phase over an isomerisation catalyst at elevated temperature, continuously separating at least one xylene fraction from the product, and continuously recycling the residual mixture, preferably in vapour form, to the isomerisation reaction zone. Preferably the feed is maintained at substantially constant composition, which may be effected by introducing make-up. Preferably, also, the total xylene content of the mixture is from 30% to 70% by weight.

The separation of one or more xylene fractions as desired may be effected, for example, by continuous fractional distillation, followed by return of the undesired components to the isomerisation zone.

The process has great value for the production of p-xylene, and it is then preferred to separate p-xylene by freezing it out at temperatures below atmospheric, and in particular to freeze it out in the presence of an inert diluent, for example, at temperatures of −75° C. and less. It is a great benefit to employ as diluent a product of the isomerisation process or a component of the original mixture, for example toluene, trimethylbenzenes, or ethylbenzene. When ethylbenzene is the diluent the process and methods described in U. S. application Serial No. 147,428, filed March 3, 1950 can be applied with advantage. If the diluent is a product of the reaction it tends to give a favourable proportionation in the isomerisation process. Diluents such as toluene, ethylbenzene and trimethylbenzenes may be employed in amounts of up to 200% by weight, but are preferably present in a proportion of about 100% by weight, of the total xylenes.

In order to keep the concentration of undesired compounds produced in the isomerisation reaction within reasonable working limits, whatever the method of separating the desired xylene fraction or fractions, a proportion of the circulating burden may be purged intermittently or continuously as desired, and this may be treated, for example by fractional distillation for recovery of useful compounds, and in particular for those which can be used as reactants in the isomerisation process or diluents in the separation of para-xylene by freezing.

Suitable catalysts for use in the isomerisation reaction are alumina silica gel and alumina treated with fluorine or with fluorine-containing compounds, for example silicon tetrafluoride. With these catalysts a temperature of 400° to 500° C. and a space velocity of, for example, about 3 hours $^{-1}$ in terms of bulk catalyst per hour, are suitable.

We have found that operating a cyclic process as described above comprising continuous isomerisation and separation of p-xylene by freezing out from the isomerisation product, it is possible to increase the concentration of p-xylene per pass from roughly about 8% to roughly about 16% of the total xylenes present and, therefore, to separate an amount of p-xylene equivalent to roughly about 8% of the total xylenes present.

The invention depends largely on the surprising discovery we have made that mixed xylenes when subjected to the above defined reaction conditions tend to approach an equilibrium composition and that neither the total concentration of xylenes nor that of the individual xylenes in the mixture is then much further altered by recycling. Thus we have found that employing a space velocity of 3 hours$^{-1}$ and a temperature of 450° C. very little change in composition occurs after 30 cycles. We have also found that various other compounds are produced simultaneously in the process, for example, toluene, mesitylene and pseudocumene. For all practical purposes the by-products build up to a point which may be regarded as an equilibrium. Little further degradation of xylenes and formation of by-products therefore occurs, and the separation of para-xylene during each cycle from this substantially equilibrium mixture provides a ready and economic method for its production.

As already indicated, in practice there may be a gradual build up of undesired products and it is therefore preferred to purge a portion of the vapours from the isomerisation step either intermittently or continuously. This purged material can be distilled in one or more stills for recovery of: mixed xylenes and toluene (which are returned to the isomerisation reactor) and benzene as head products; and polyalkyl benzenes (initial boiling point 150° C.) as tails; which may both be disposed of in any convenient manner.

The discovery on which the invention rests is illustrated by the following experiment.

98% pure p-xylene was repeatedly passed over a catalyst, comprising alumina which had been treated with silicon tetrafluoride, employing a temperature of 450° C. and a space velocity of 0.5 hour$^{-1}$. After 5 passes detected changes in the composition of the mixture were small, and analysis by fractional distillation and examination by infra-red spectroscopy gave the following as the composition.

| Compound: | Volume per cent |
|---|---|
| Benzene | 1.0 |
| Toluene | 21.9 |
| o-Xylene | 10.6 |
| m-Xylene | 26.5 |
| p-Xylene | 11.3 |
| Pseudocumene | 15.2 |
| Mesitylene | 6.6 |
| Hemimellitene | 2.2 |

After 6, 7 and 8 passes respectively, the composition of the product was substantially constant and the proportions of the more important components of the mixture as determined by infra-red spectroscopy were then approximately:

| Compound: | Volume per cent |
|---|---|
| Toluene | 23 |
| o-Xylene | 9 |
| m-Xylene | 24 |
| p-Xylene | 10 |

Speaking in broad terms, a mixture of this typical composition can be produced from a hydrocarbon mixture containing mixed xylenes, and the xylenes can then be separated therefrom, and in particular p-xylene, by freezing out from the liquor at low temperatures, for example from about −75° C. down to about −100° C.

According to a preferred feature of the invention, therefore, there is provided a continuous process for the production of p-xylene which comprises passing a hydrocarbon mixture containing xylenes in the vapour phase over an isomerisation catalyst at elevated temperature, continuously passing the product to a cooling zone, together with make-up, and there freezing out a fraction rich in p-xylene under such conditions that the para/meta xylene eutectic does not separate, continuously separating the solid p-xylene fraction, and continuously vaporizing the residual liquid and returning the vapour to the isomerisation zone. Preferably in this process a portion of the vapour is urged during each cycle prior to the isomerisation zone and the isomerisation product is fractionally distilled for removal of benzene and toluene as overheads and again for separation of xylenes as overheads which latter are passed to the cooling zone.

While known isomerisation catalysts such as alumina silica gel may be employed for the isomerisation stage it is preferred to use alumina/silica gel or alumina which have 500° C. with an isomerization catalyst to obtain an isomerizate enriched in p-xylene, removing benzene and toluene as overheads and trimethyl benzenes as bottoms from this isomerizate by distillation to obtain the prepared isomerizate for feeding to the said cooling zone, the whole process being operated continuously and in step.

6. The process of claim 5 wherein said catalyst is an alumina/silica gel catalyst.

References Cited in the file of this patent

UNITED STATES PATENTS

| | | |
|---|---|---|
| 2,403,757 | Reeves | July 9, 1946 |
| 2,418,689 | Benedict et al. | Apr. 8, 1947 |
| 2,425,559 | Passino et al. | Aug. 12, 1947 |
| 2,483,131 | Garrison | Sept. 27, 1949 |
| 2,532,276 | Birch et al. | Dec. 5, 1950 |
| 2,564,388 | Bennett et al. | Aug. 14, 1951 |